United States Patent [19]

Oki et al.

[11] Patent Number: 5,465,632
[45] Date of Patent: Nov. 14, 1995

[54] STEERING WHEEL HAVING A STATIONARY DISPLAY

[76] Inventors: T. Jack Oki; Martin D. Oki, both of 96 Banbury Road, Don Mills, Ont., Canada, M3B 2L3

[21] Appl. No.: 238,425

[22] Filed: May 5, 1994

[51] Int. Cl.⁶ ........................................... B62D 1/18
[52] U.S. Cl. ..................... 74/493; 74/484 R; 74/498; 74/531
[58] Field of Search ................... 74/484 R, 493, 74/531, 498; 280/775

[56] References Cited

U.S. PATENT DOCUMENTS

| | | | |
|---|---|---|---|
| 3,803,939 | 4/1974 | Schenten | 74/531 X |
| 4,429,588 | 2/1984 | Emundts et al. | 74/484 R |
| 4,527,444 | 7/1985 | McKee et al. | 74/484 R X |

FOREIGN PATENT DOCUMENTS 54-20531  2/1979  Japan ............................. 74/484 R

*Primary Examiner*—Allan D. Herrmann
*Attorney, Agent, or Firm*—Jane Parsons

[57] ABSTRACT

The invention concerns a multi-function steering mechanism having a non-rotatable display panel located within the rim of the steering wheel. Wires of a wiring truss to the display panel are continuous through a hollow non-rotatable support shaft for the display panel. The rotatable steering shaft is offset from the support shaft and geared to a cylindrical gear hub of the steering wheel which is rotatably supported on either the support column or onto an outer housing for the mechanism. The steering shaft is made to be telescoping and or tilting.

8 Claims, 3 Drawing Sheets

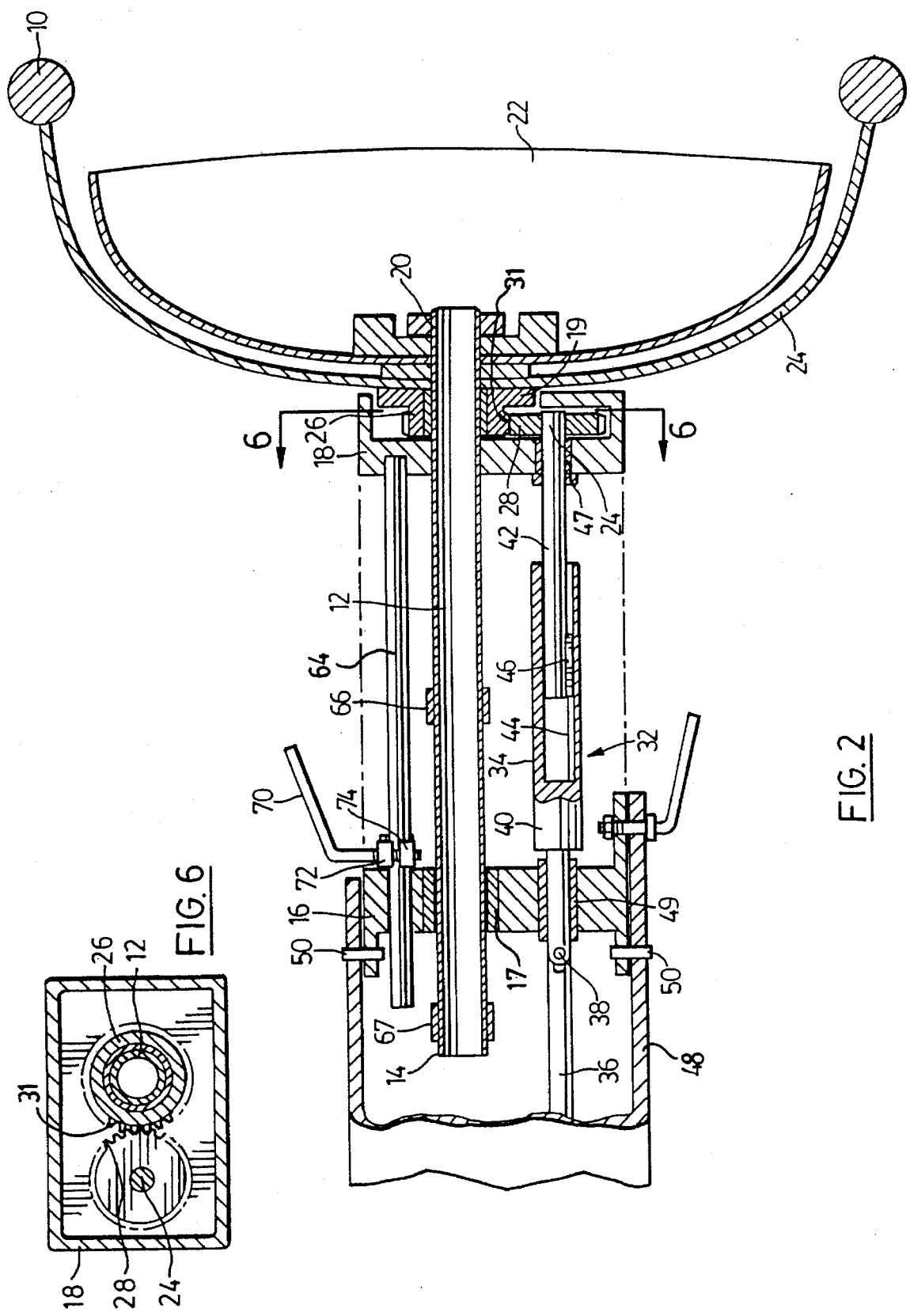

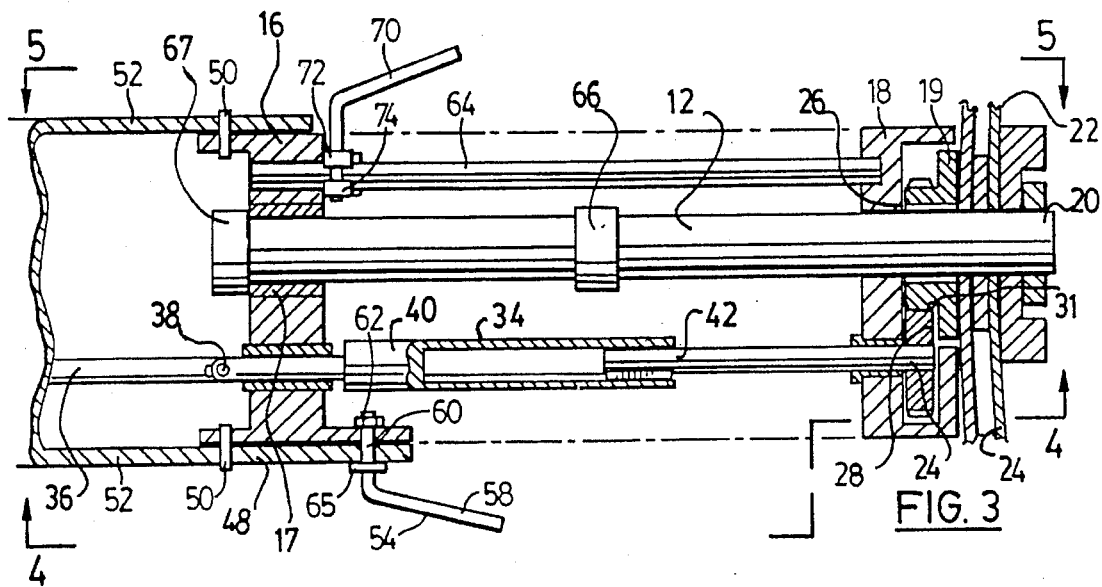
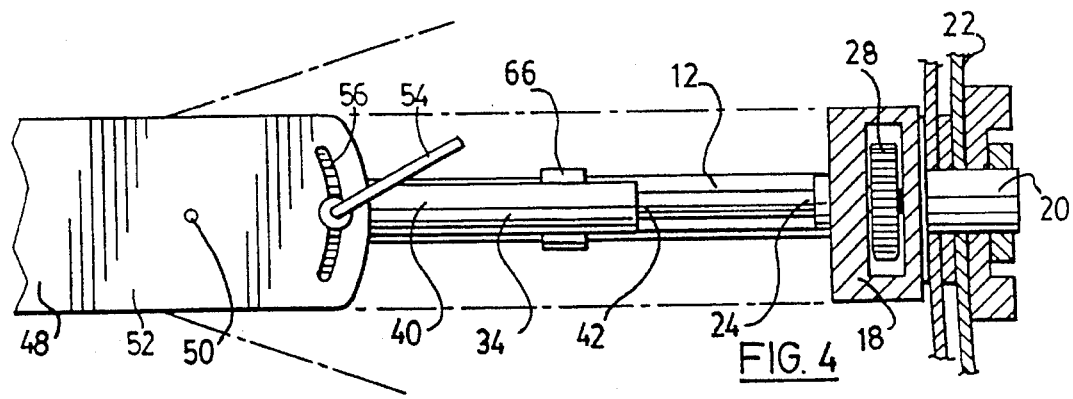
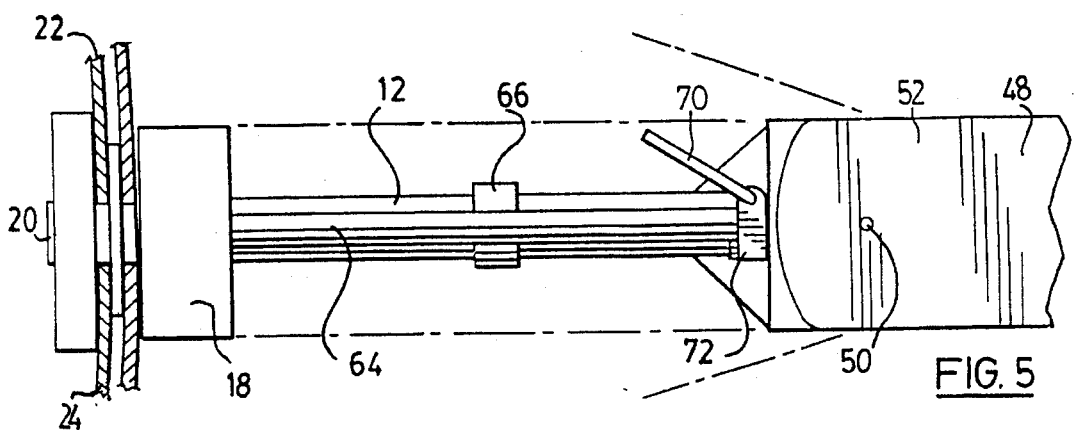

STEERING WHEEL HAVING A STATIONARY DISPLAY

BACKGROUND OF THE INVENTION

1. Field of the Invention

This invention relates to a multi-function steering mechanism for a motor vehicle.

2. Description of the Prior Art

For a considerable period it has been the practice to mount control devices for various functions on a conventional steering column. There is, however, a practical limit to the number of manually actuable switches which may be conveniently disposed on the steering column. In the age of a rapidly developing electronic information super-highway, developments in the display and use of information in the automobile lead to the necessity for even more easily accessible switches.

Attempts have been made to dispose such switches on the steering wheel itself. The vehicle horn has, for example, been disposed centrally in the steering wheel when it is not disposed on a column projecting therefrom, when only one such device is used, or even more than one device, conventional slip rings and wiper devices such as that disclosed in U.S. Pat. No. 4,157,854 issued Jun. 12, 1979 to Beauch may be used to conveyed electricity between the non-rotatable steering shaft on wheel for each device. When more than a very few switches are to be used, each controlling a different function, the slip ring arrangement becomes impracticable due to the limit on the number of slip rings which may be disposed between the steering wheel and the support column.

As a result the conventional recently designed cars are fitted with a multitude of electronic displays and devices placed all around the driver. These displays and devices are located from the left side of the steering column, across the dash and up unto the roof. Many are difficult to see and operate, with the driver taking the real risk of an accident by looking down or up for an extended time. Many are difficult to see in bright or dim lighting. The proliferation of electronic devices and systems will reach a point where some devices can only be used or operated with great risk to the driver/operator, and worse, to other drivers in the flight path.

The U.S. Federal Highway Agency, recognizing the problem, particularly with the rapidly increasing elderly population, has provided a grant for design students at California Art College to develop car gauges, controls and seats that are easier for aging drivers to use.

Since non-rotatable display panels within the periphery of the steering wheel are very desirable both from a design point of view and for practicality, numerous attempts have been made to solve the problems presented. The solutions provided have generally been electrically complex and sophisticated.

For example, U.S. Pat. No. 4,616,224 issued to Oct. 7, 1986 to Reighard disclosed a transmitter/receiver pair to convey information relative to the operation of devices between the steering wheel and the support column; U.S. Pat. No. 4,456,903 issued Mar. 20, 1984 to Tsuchida et al and U.S. Pat. No. 4,321,474 issued Mar. 23, 1982 to Tanaka et al discloses multiplexing signals from switches on the steering wheel and a light emitting device to generate a signal in response to the multiplexed output signal, a decoder unit being provided to decode the output signal of the light emitting device; and U.S. Pat. No. 4,635,029 issued Jan. 6, 1987 to Yamada again utilizes light to transmit information between a stationary unit and a control board mounted on a steering wheel, light emitting and receiving means being provided on each of the statutory unit and the control board. Such electrical systems may be complex, expensive and sophisticated. Various mechanical devices may be utilized to maintain a display panel central of the steering wheel non-rotatable with respect thereto. U.S. Pat. No. 4,368,454, for example, discloses one such system.

One simple mechanical system utilizing direct connection of wiring to a non-rotatable display panel within the periphery of the steering wheel, to provide an inexpensive robust alternative to the various remotely operated systems referred to, is described and claimed in Canadian Patent No. 1,318,883 issued Jun. 8, 1993 to Oki and in U.S. Pat. No. 5,072,628 issued Dec. 17, 1991 to Oki. The systems of said Canadian and U.S. Patents issued to Oki have an offset steering shaft and a central hollow carrier shaft carrying wiring connectors to a cental steering wheel display. The resultant housing for the steering shaft and carrier shaft may be of greater diameter than that for a conventional single steering shaft. Consequently, provision of the tilt and telescoping features for steering wheels having an offset steering shaft and a central carrier shaft have been a problem.

The present inventor, who is also the patentee of Canadian Patent No. 1,318,833 and U.S. Pat. No. 5,072,628 already referred to, has addressed the problem of providing tilt and telescoping mechanisms for steering wheels having stationary central displays.

In addressing these problems, the inventor was concerned that many devices which are being developed as aids to driving, or to add the ability to communicate from within the shell of a vehicle and/or to add to the comfort of the driver/passenger, are hazards and may create new dangers on an already dangerous roadway. Accidents may, for example, be caused by a portable telephone in a driver's hand. Yet, audio communication must be an integral part of the information superhighway.

Even with the most advanced technology available today, and even tomorrow, for the information superhighway, there is no doubt that, eventually, there will only be two basic mediums. These two will be audio and video messages. Therefore, design priority was to place the audio and video interface devices at the most convenient, efficient, comfortable and, most important, the least hazardous to driving location.

Of the devices currently in use, the telephone may be one of the required devices. However, in its present form, it may be too hazardous to use while the car is in motion.

Audio entertainment and information devices have increased: AM/FM radio, tape player, CD player, etc. These devices/systems have become quite complicated to operate and difficult to see, and the controls are awkward to reach and manipulate.

The ideal location for visibility and ease of operation is right in front of the operator/driver.

The applicant has, therefore, provided a master panel located in front of the operator/driver inside the steering wheel. The master panel will be isolated from the steering wheel so that it is stationary and does not rotate with the steering wheel.

It is desirable that the steering wheel include telescoping and tilting features to fine tune the position of the master panel to the optimum viewing position of the operator/driver.

SUMMARY OF THE INVENTION

According to the invention, there is provided a multi-function steering mechanism for a motor vehicle including a display console, comprising a rotatable steering wheel being in steering connection with at least one road wheel of the motor vehicle through a steering shaft parallel with and offset from a support shaft;

a display panel being located within the periphery of the steering wheel and being non-rotatably mounted on the support shaft;

a wiring truss running within the support shaft, individual wires of which wiring truss are directly connected to individual units of the display panel;

the steering shaft comprising a telescoping first shaft part one end of which is rotatably supported through a hub of the steering wheel and the other end of which is connected through a universal joint to a second shaft part;

a bearing member supported by a housing for the second shaft part of the steering shaft, the support shaft being slidably mounted in the bearing member so that a free end extends therethrough, and the first shaft being mounted in the bearing member to be rotatable therein;

the bearing member being pivoted to the housing through a pair of pivots aligned with the universal joint.

Preferably the mechanism includes a balance shaft offset from the support shaft diametrically opposite to the steering shaft, the balance shaft being supported slidably through the bearing member and at one end by the hub of the steering wheel. The telescoping first shaft part of the steering shaft may comprise first and second telescoping members and means to prevent respective rotation of said first and second telescoping members, such as a keyway on one of the first and second telescoping members, the keyway engaging a key of the other of the first and second telescoping members.

A clamp may be provided which is manually operable to prevent telescoping of the first and second telescoping members and sliding of the balance shaft and support shaft. It is only necessary that the clamp act on one of the shafts since if no sliding of one shaft is possible then all of them are prevented from sliding. The clamp may conveniently act on the balance shaft.

A handle may be provided for manual adjustment of the pivotal position of the housing, and a manually operable clamp may be provided to prevent pivoting of the bearing member with respect to the housing.

BRIEF DESCRIPTION OF THE DRAWINGS

An embodiment of the invention will now be described by way of example with reference to the drawings, in which:

FIG. 2 is a top sectional elevation showing the steering wheel column embodying the invention in the half extended position;

FIG. 3 a scrap section, similar to FIG. 1, showing the support shaft withdrawn to its maximum limit, and abutting the limit stop;

FIG. 4 is a sectional elevation of one side taken on the line 4—4 of FIG. 3 showing the tilting and locking means;

FIG. 5 is an elevation of the other side taken on the line 5—5 of FIG. 3 to show the telescoping locking clamp means; and FIG. 6 is a section of the line 6—6 of FIG. 2.

DETAILED DESCRIPTION OF A PREFERRED EMBODIMENT

Figure 1:
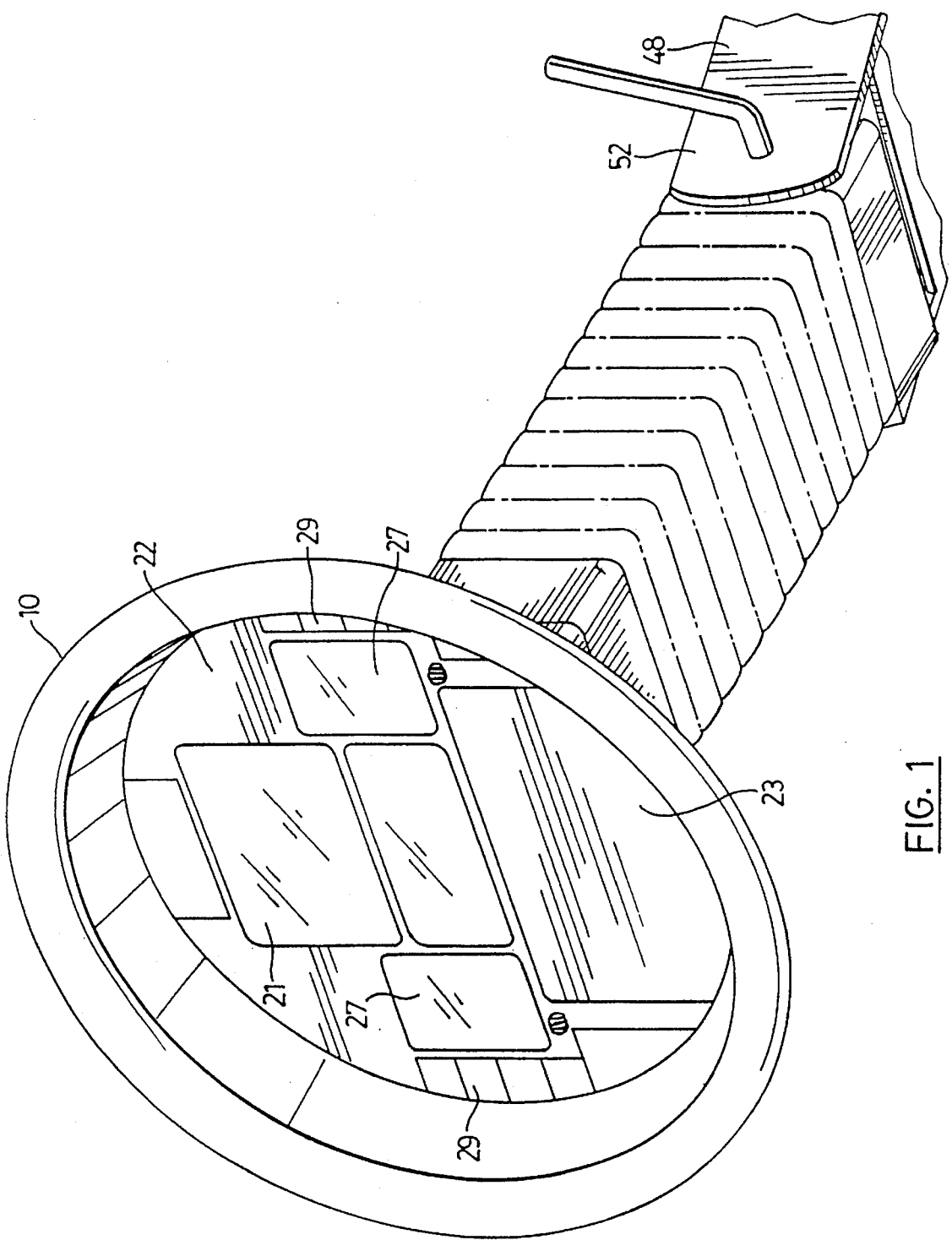
FIG. 1 is a general view of a display steering wheel.

In the drawings, a steering wheel number 10 is rotatably journalled on a support shaft 12. The support shaft 12 may slide in the region of lower end 14 in bearings 17 of a bearing member 16 to be extensible therefrom. The steering wheel 10 is carried by a collar 18 about the support shaft 12 in the region of its other end 20. The shaft 12 is hollow to carry a wiring truss to a display panel 22 which is mounted at end 20 of the support column 12 to lie within the periphery of the steering wheel 10. Wires of the truss from the respective display panel 22 lead continuously from the respective switch or display unit on the display panel to the respective controller/controlled unit with which they are associated.

The display panel screen 21 may be a colour monitor for display of multi-media data such as route maps etc. on demand by the driver. An airbag container cover 23 need only occupy a minor portion of the display panel 22, for example, a lower part as shown. Displays 22 may be a telecommunication control panel with microphone speakers mounted either in a fixed position or mounted on a retractable column which may adjust the position closer to the driver so that the driver need not hold the telephone in his hand; and an entertainment systems control panel, etc., and some operative push buttons 29 for example for cruise control, security, lights, heat, emergency flashers, seat adjustment, etc. Speakers may be provided on the display panel to serve any of the audio functions including the telephone.

The steering wheel may be of any convenient shape, but is conveniently circular and dished through a dish which may be a continuous surface or comprise one or more spokes 24 so that a front face of the display panel 22 is either flush with or slightly recessed from the plane of the steering wheel 10. The steering wheel 10 is provided with a hub 19 journalled onto support column 12 by bearings 26. An outer cylindrical surface of hub 19 is geared to mesh with corresponding gearing 28 on an end 24 of an elongate steering shaft 32.

The end 24 carrying gearing 28 may be enlarged with respect to the diameter of the shaft 32 to provide for good engagement with the gearing 31 of the outer cylindrical surface of hub 19. The gearing between hub 19 and end 24 of shaft 32 may be of any suitable type, for example, toothed gearing, and will not be described in detail. A first telescoping shaft part 34 of steering shaft 32 is rotatable about its longitudinal axis in bearings 47 of collar 18 and bearings 49 of the bearing member 16 by rotation of the steering wheel 10 and hub 19 such that the gearing of the hub 19 meshes with the gearing 28 on the end 24 of the steering shaft 32 to turn it.

Steering shaft 32 is formed of two end to end telescoping first shaft part 34 and second shaft part 36 connected through a universal joint 38. Member 34 extends through bearing member 16 and is rotatably journalled in it in bearings 49 telescoping first shaft part 34 is formed of a pair of telescoping members 40 and 42 which are non-rotatable with respect to one another. The respective non-rotatability of members 40 and 42 may be achieved by means of a keyway 44 parallel to the shaft axis of member 40 engaging a key 46 of member 42.

The bearing member 16 is pivotally supported in an upper end of a housing 48 for the steering shaft 32 and the support shaft 12. The bearing member 16 is pivoted to the housing 48 on a pair pivot pins 50. One of these pivot pins 50 lies to one side of the housing 48 and the other pivot pin 50 lies directly opposite to it on the other side of the housing 48 and in line with universal joint 38. Thus, pivotal movement of bearing member 16 causes tilting of the steering shaft part 34 and the support shaft 12. This results in tilting of the steering wheel 10.

It is, of course, necessary that the profile of the sides 52 of housing 48 are shaped to allow tilting of bearing member 16 within the housing. As illustrated, housing 48 is roughly of rectangular cross-section, the sides 52 being flat. Other shapes are, of course, possible. Such shapes being any shape having a pair of opposed flat parallel sides 52. If at their upper and lower extremities the sides 52 curve, for example, inwardly, there will be some limitation of the tilting movement. In fact, limitation of the tilting movement is desirable in any case and lever 54 projecting through slot 56 in housing 48 is provided for this purpose.

Lever 54 has a handle part 58 and a shank part 60. Slot 56 which is arced to match the radius of pivoting of bearing member 16. The distal end of shank 60 is attached to bearing member 16 possibly by means of screw threading on the shank and along the lock nut 62. An additional lock nut 65 may be present at the proximal end of the shank. Lock nut 65 may be tightened to prevent movement of the shank in the slot 56 so that the chosen tilt may be maintained.

An additional balancing shaft 64 is provided in opposed relationship to steering shaft part 34. The balancing shaft 64 may provide extra rigidity to the arrangement. One end of shaft 64 is anchored in collar 18 and the other end of shaft 64 may be slidable in a linear bearing of bearing member 16.

Since steering shaft part 34 is telescopic by means of key 46 of member 42 of steering shaft part 34 running in keyway 44 of member 40 of steering shaft part 34 and since shaft 12 and shaft 64 are linearly slidable in bearing member 16, it is possible to adjust the linear position of the steering wheel 10. The steering wheel 10 may be moved closer to the housing 48 by pushing the steering wheel such that shaft 12 and shaft 64 slide through the bearing member 16 into the housing and member 42 telescopes into member 40. The steering wheel 10 may be moved further away from the housing by pulling the steering wheel so that support shaft 12 and balance shaft 64 slide out of the housing and telescoping member 40 moves out of member 42 with the key 46 running in keyway 44. Stops 66, 67 may be provided to limit the linear movement of the steering wheel. As shown stops 66, 67 are on support shaft 12 but it is equally possible that they might be provided on the balance shaft 64.

FIG. 2 shows the steering wheel in mid-position with neither of stops 66, 67 preventing linear sliding of shaft 12 with respect to the bearing member 16. FIG. 3, however, shows the shaft 12 extended out of the housing as far as possible with stops 66, 67 engaged against a rear surface of the bearing member 16.

It is, of course, desirable that a manually operable locking mechanism be provided to prevent inadvertent extension or retraction of the steering wheel and tilting thereof. Such a locking mechanism for the telescoping and tilt devices can be a simple nut and bolt unit, a quick action spring loaded detent lock, or other conventional device in general use. As illustrated, one suitable form of clamp may comprise a lever 70 which in one position holds a clamping block 72 to clamp balance shaft 64 firmly against a fixed clamping 74 so that it cannot move linearly. In a second position of lever 70 clamping block 72 is free from engagement with the shaft 64 to allow linear movement. It is to be noted that once any one of the shafts 64, 12 or the member 40 are fixed against linear movement it will not be possible for any of the other members to move linearly. Since steering shaft member 34 is rotatable in bearing member 16 no deleterious effect will be transmitted to the steering.

I claim:

1. A multi-function steering mechanism for a motor vehicle including a display console, comprising a rotatable steering wheel for the motor vehicle and a steering shaft parallel with and offset from a support shaft;

a display panel being located within the periphery of the steering wheel and being non-rotatably mounted on the support shaft;

the steering shaft comprising a telescopic first shaft part one end of which is rotatably supported to mesh with gearing of a hub of the steering wheel and the other end of which is connected through a universal joint to a second shaft part;

a bearing member supported by a housing for the steering shaft, the support shaft being slidably mounted in the bearing member so that a free end extends therethrough, and the telescoping first shaft part being mounted in the bearing member to be rotatable therein;

the bearing member being pivoted to the housing through a pair of pivots aligned with the universal joint.

2. A multi-function steering mechanism as claimed in claim 1 which includes a balance shaft offset from the support shaft diametrically opposite to the steering shaft, the balance shaft being supported slidably through the bearing member and at one end by the hub of the steering wheel.

3. A multi-function steering mechanism as claimed in claim 1 in which the telescoping first shaft part of the steering shaft comprises first and second telescoping members and means to prevent respective rotation of said first and second telescoping members.

4. A multi-function steering mechanism as claimed in claim 3 in which the means to prevent rotation comprises a keyway on one of the first and second telescoping members, the keyway engaging a key of the other of the first and second telescoping members.

5. A multi-function steering mechanism as claimed in claim 2 in which a clamp is provided which is manually operable to prevent telescoping of the first and second telescoping members and sliding of the balance shaft and support shaft.

6. A multi-function steering mechanism as claimed in claim 5 in which the clamp acts on the balance shaft.

7. A multi-function steering mechanism as claimed in claim 1 in which a lever is provided for manual adjustment of the pivotal position of the bearing member with respect to the housing.

8. A multi-function steering mechanism as claimed in claim 7 in which a manually adjustable clamp is provided to prevent pivoting of the bearing member with respect to the housing.

* * * * *